UNITED STATES PATENT OFFICE.

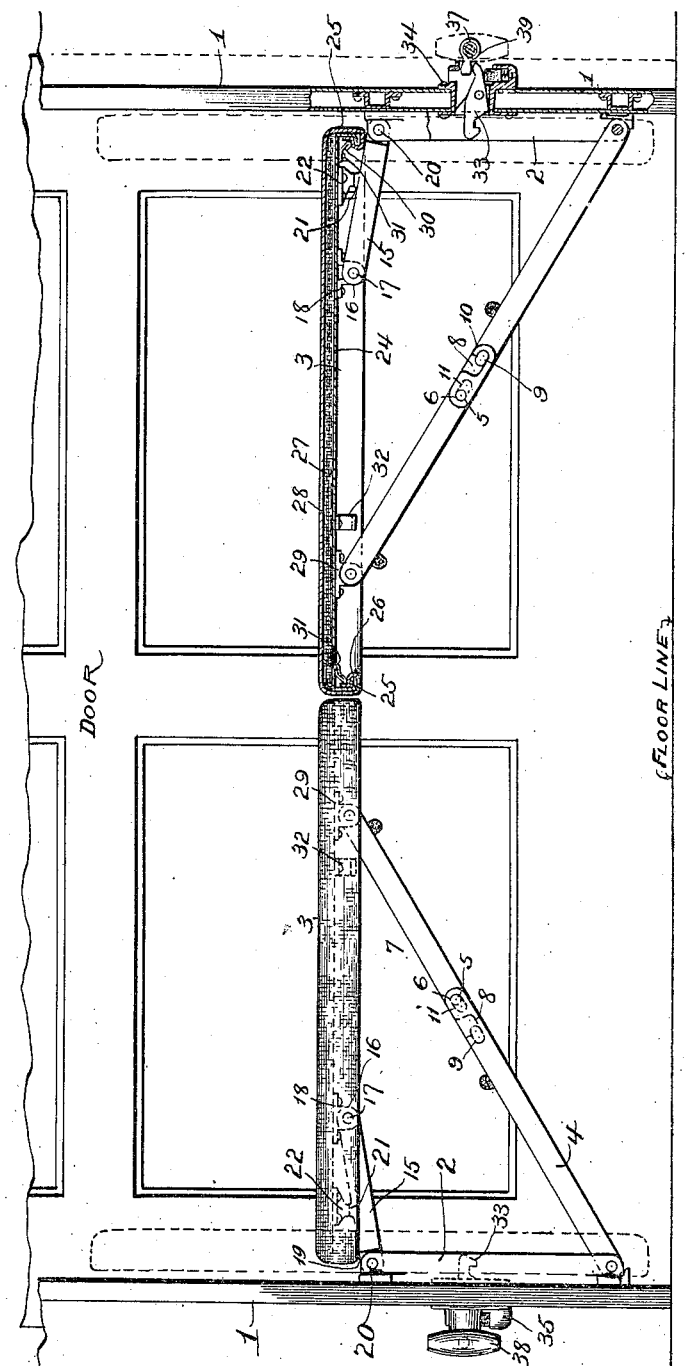

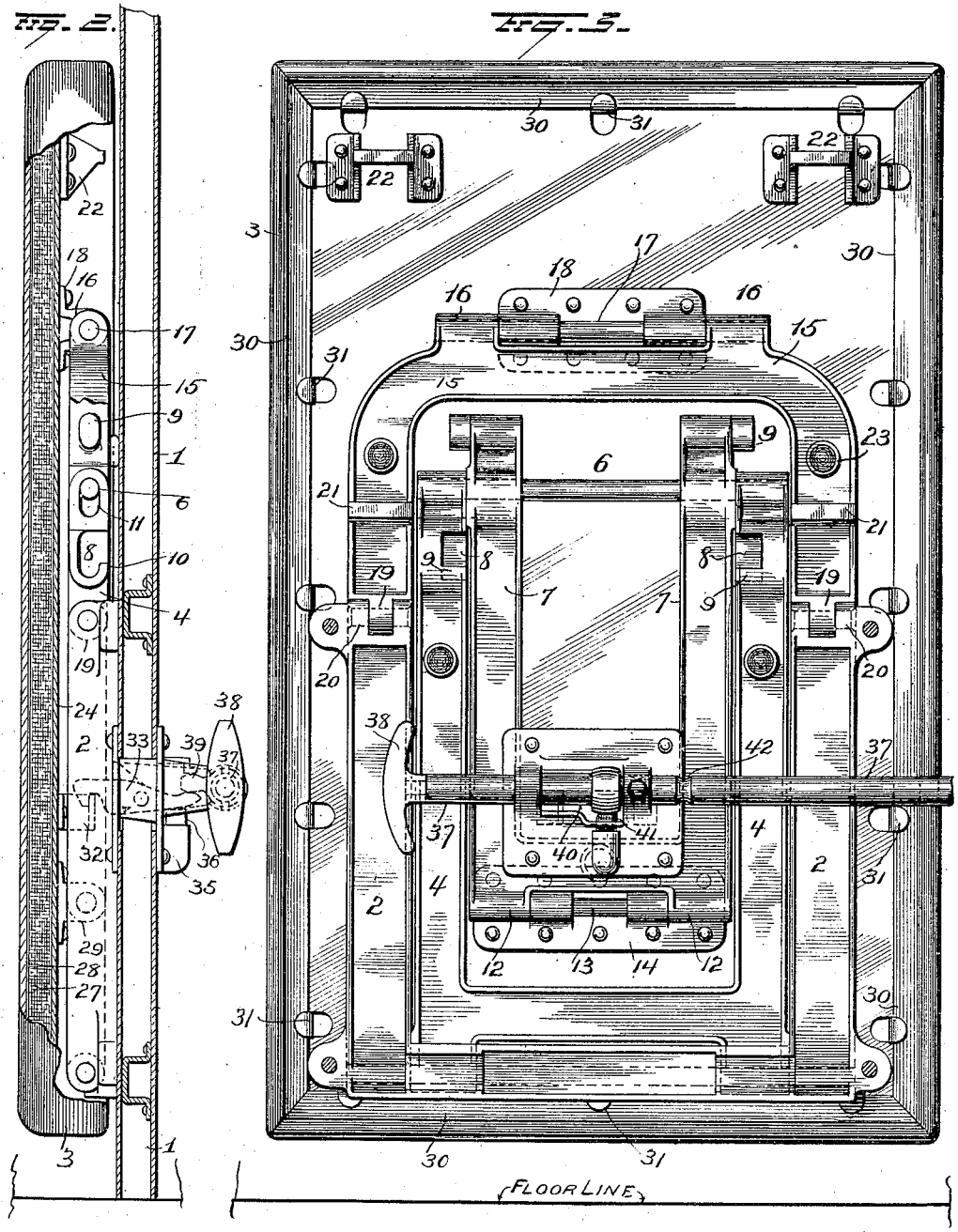

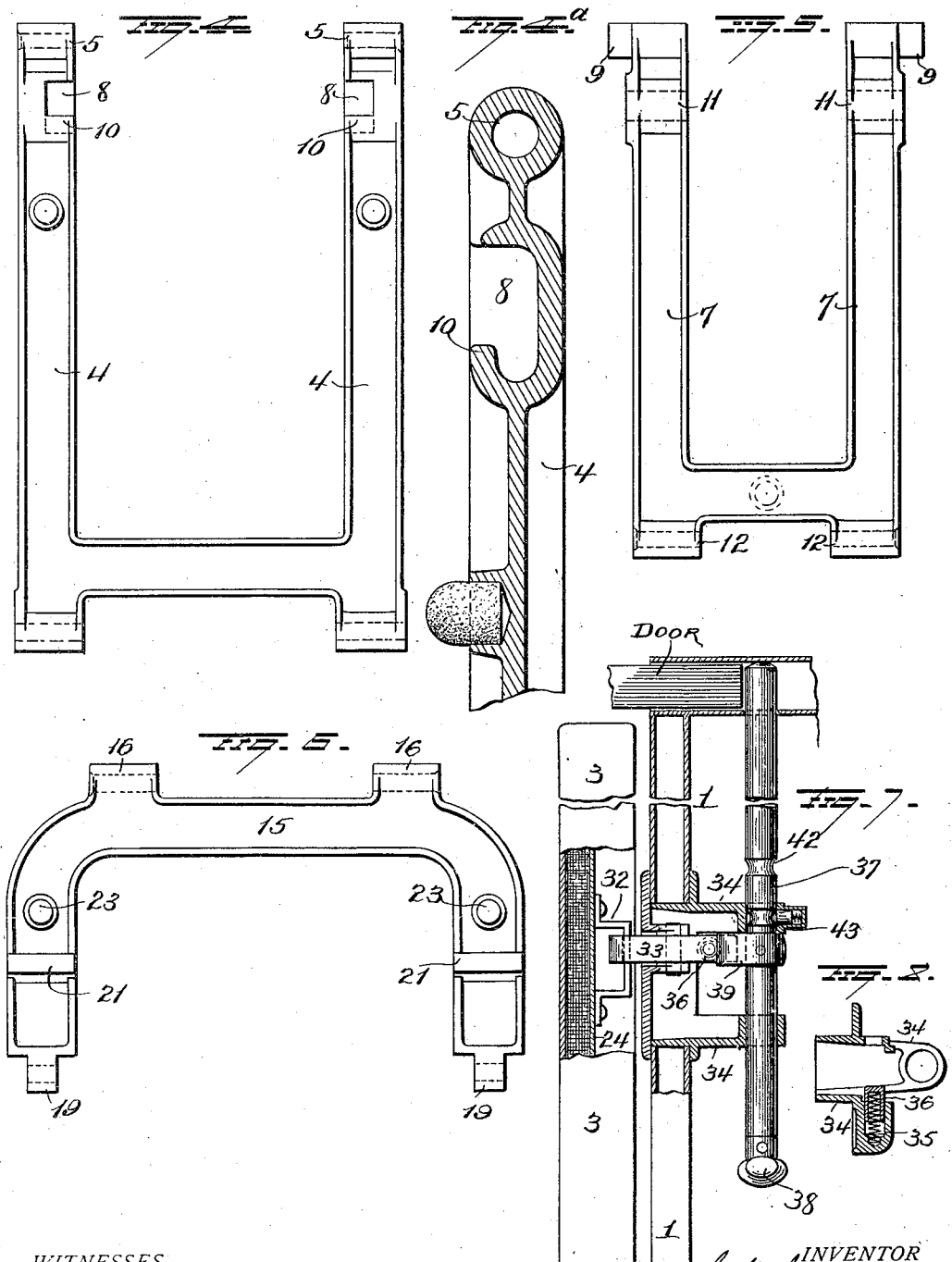

CHARLES H. ANDERSON, OF CINCINNATI, OHIO.

FOLDING SEAT FOR CENTER-DOOR CARS.

1,244,823.  Specification of Letters Patent. Patented Oct. 30, 1917.

Application filed October 19, 1914. Serial No. 867,371.

*To all whom it may concern:*

Be it known that I, CHARLES H. ANDERSON, a citizen of the United States, and resident of Cincinnati, in the county of Hamilton and State of Ohio, have invented certain new and useful Improvements in Folding Seats for Center-Door Cars; and I do hereby declare the following to be a full, clear, and exact description of the invention, such as will enable others skilled in the art to which it appertains to make and use the same.

My invention relates to improvements in folding seats for cars.

Many of the elevated and subway cars are provided with center and end doors, the center doors being used only during rush hours. The center doors slide in a direction parallel with the side of the car, and the object of my invention is to utilize the space adjacent these doors for seating passengers when the doors are not in use, and it consists in seats hinged to cross panels of the car and adapted to be turned up against said panels when not in use, and locking means for holding the seats against the panels and for preventing the door from being opened when the seats are down in their operative positions.

My invention further consists in the parts and combinations of parts as will be more fully explained and pointed out in the claim.

In the accompanying drawings, Figure 1 is a view in side elevation, partly in section showing the two seats in the space intermediate the cross panels of a center door car; Fig. 2 is a view showing one of the seats folded up against its panel; Fig. 3 is a rear face view of one of the seats showing its support, also the latch and sliding door locking shaft; Fig. 4 is a view in plan of the lower link of the pair supporting the outer end of the seat; Fig. 4ᵃ is a view in section of one end of the link; Fig. 5 is a similar view of the upper link of the pair; Fig. 6 is a similar view of the link supporting the inner end of the seat; Fig. 7 is a view in section showing the latching and unlocking means for the seat and Fig. 8 is a view in section of the frame carrying the sliding and rocking shaft.

In cars of the type for which my improved seat is particularly adapted, the center door slides parallel with the side of the car, and the seats at the side of the center entrance terminate in a vertical panel or partition 1 adjacent each side of the door frame. Secured to the outer, or adjacent faces of the two panels 1 are the U-shaped metal frames 2, one on each panel. The panels 1, are shown hollow and made of sheet metal but this is unimportant, as they may be of wood. 3 are the seats, one carried by each panel, and adapted when in their normal position, to abut or come close enough together to form a continuous seat extending from one panel to the other, and of course blocking the door way, the sliding door forming the back for said seats. As the supporting means for both seats are alike, a description of one will suffice for both.

Pivotally secured or hinged to the frame 2 at the lower end of the latter, is the U-shape link 4, shown detached in Figs. 4 and 4ᵃ. This link is provided at the free ends of its two side members with holes 5 for the passage of a bolt or pins 6, which connect it with the U-shaped link 7, and is also provided on the upper face of each of its side members with an elongated recessed seat 8, the latter being partly open at the top as clearly shown in Fig. 4ᵃ, for the entrance and reception of the elongated outwardly projecting lugs 9 formed at the extreme outer ends of the side members of the link 7. These recessed seats (one in each side member of the link) are partly closed at the top, as at 10, so that when the lugs 9 on yoke 7 have been entered in the open top of the recess, and then moved downwardly therein they will rest under the overhanging portion 10 of the links 4, and be locked against turning movement. Link 7 is of less width than link 4, so that it may be turned into a position between the members of link 4, and is provided near the outer ends of its side members with the elongated holes 11 for the passage of the pin or bolt 6, which as before explained is carried by the link 4 and connects the latter with link 7. This link 7 is also provided at its opposite or closed end, with knuckles 12 for its pivotal, or hinge attachment to the bolt 13 carried by brackets 14 secured to the underside of the seat near the outer end of the latter.

15 is the top link, also U-shape, as shown in Fig. 6, and provided at its outer end with the ears 16 each having a hole through same for the passage of bolt or pin 17, carried by bracket 18 secured to the underside of the seat 3 near the inner end of the latter, and is provided at the free ends of its side members, with the ears 19 having holes through same for the pins or bolts 20, which secures it to the frame 2 at the upper end of the latter. The link 15 is also provided on the upper face of its side members with the lugs 21 against which the stop 22 secured to the underside of the seat 3 abuts when the seat is in its operative position, and with the soft rubber cushion 23 which contacts with the panel 1 when the seat is turned up against the latter as shown in Fig. 2.

The seat 3 consists of a metal bottom plate 24, having downwardly flanged edges 25, the extreme edges 26 of the flanges being turned inwardly as shown. This bottom plate is covered with felt 27 held in place by a canvas covering 28, which is faced with ratan 29. The ratan facing is carried down and under the edge flanges 25 of the bottom plate and then up against the inside of said flange, and is held in place, by the clamping strips 30 each of which bears at one end against the facing 29 at the point where the latter bends over the inwardly turned edges of the flanges, and at their other ends against the tongues 31, cut out from the body of the plate 24 and bent downwardly to engage and clamp the upper ends of the strips 30.

The bottom plate 24 is also provided with a keeper 32, which is adapted to be engaged by the latch 33, when the seat is turned up against its panel 1 as shown in Fig. 2. This latch is mounted in the casing 34 secured to and passing through the panel 1, and the casing is provided at the rear of the panel with a recessed seat 35 in which the spring actuated plunger 36 is mounted, the upper end of said plunger bearing against the underside of the tail of the latch 33 and yieldingly holding the hook or outer end of the latch downwardly so as to engage the keeper 32.

Journaled in bearings on the casing 34, at the rear of the panel 1, is the sliding and rocking shaft 37, which is provided at its front end with a handle 38 by which it may be rocked and moved longitudinally. This shaft is also provided intermediate its ends with a finger 39 adapted to be moved into position over the tail of the latch for depressing same to disengage the latch from the keeper. The casing 34 is slotted, as at 40, so as to permit the finger 39 to be moved toward and away from the tail of the latch, and the lower wall of this slot dips or is cut away in the plane of the tail of the latch as at 41, so as to permit the finger 39 to be moved downwardly when said finger is in a position over the latch. In the other position of the finger 39, the latter will engage the bottom wall of the slot and be prevented from turning. The handle on the shaft is more or less exposed and is liable to be handled by children and struck by objects being carried through the car, hence by constructing the parts so that the shaft must be moved longitudinally before it can be turned to release the seat, all danger of the accidental release of the latter is avoided. The shaft 37 extends crosswise the panel and beyond same and into the path of movement of the sliding door of the car, so that when the shaft has been moved to a position where its finger 39 can engage the latch to disengage the latter from its keeper on the seat, the inner end of the shaft will project behind the sliding door and into the path of movement of the same, so that the door will be locked against opening movement prior to the release of the seat from the panel. The parts are so proportioned and located that the shaft 37 cannot be moved to a position where its finger 39 can engage the latch until the door has been closed, as the latter prevents complete throw of the shaft, hence with this improvement, the shaft forms a lock for the door when the seat is down, and prevents the seat from being released to be lowered when the door is opened, thus eliminating the possibility of the door being opened accidentally or otherwise when the seats are down or in operative position.

If desired the shaft may be provided with the peripheral grooves 42, and the bearing for the shaft with a spring plunger 43 adapted to rest in one of said grooves and hold the shaft in its two positions against accidental or creeping movement due to the swaying of the car.

Assuming that the seats are folded up against their panels as in Fig. 2, and it is desired to lower them, the shaft 37 on the panel adjacent the rear end of the sliding door is grasped and pushed inwardly to lock the door in its closed position and is then given a part rotation so as to lift the latch to release the seat. When the seat is released it is free to be turned down, and will be locked by the lugs 9 on link 7 entering the recessed seats 8, the overhanging portion 10 of said seats operating to lock the two links together. Each seat is about half as long as the door way is wide, so that the two when lowered, completely close the door way. To raise the seats, so as to open up the door way each seat is grasped at its free end and pulled upwardly thus causing its link 7 to move on its bolt or pin 6 until its lugs 9 are clear of the overhanging portion 10 of the recessed seats, and then by pressing upwardly on the lower links, the lugs 9 will move out of the seats 8 thus leaving the seat free to be turned upwardly against the panel. In this movement the end of the seat adjacent the panel is carried upwardly by its link 15, while the link 7 folds within link 4, and when in its inoperative position, its lower end rests clear of the floor of the car.

By this arrangement for supporting the seat, I can use much longer seats than could possibly be used if they were hinged direct to the panel, and when turned up, the outer face of the seat being exposed, form a finish for the panels. When the seat is down the weight thereof locks the jointed links, and this lock can only be broken by positively lifting the seat.

It is evident that many slight changes might be resorted to in the relative arrangement of parts shown and described without departing from the spirit and scope of my invention. Hence I would have it understood that I do not wish to confine myself to the exact construction and arrangement of parts shown and described, but Having fully described my invention what I claim as new and desire to secure by Letters-Patent, is:—

In a folding seat for cars, the combination of a support, a seat, a link pivotally connected to the support and to the seat at a point removed from the inner end of the latter and jointed links pivoted to said support below the point of attachment of the first mentioned link and to the seat near the outer end of the latter.

In testimony whereof, I have signed this specification in the presence of two subscribing witnesses.

CHARLES H. ANDERSON.

Witnesses:
D. H. ACKERSON,
WM. E. NAEGEL.